US009532399B2

(12) United States Patent
Kalhan (10) Patent No.: US 9,532,399 B2
(45) Date of Patent: *Dec. 27, 2016

(54) APPARATUS, SYSTEM AND METHOD FOR MANAGING WIRELESS LOCAL AREA NETWORK SERVICE TO A MULTI-MODE PORTABLE COMMUNICATION DEVICE

(75) Inventor: Amit Kalhan, La Jolla, CA (US)

(73) Assignee: Kyocera Corporation, Kyoto (JP)

( * ) Notice: Subject to any disclaimer, the term of this patent is extended or adjusted under 35 U.S.C. 154(b) by 1669 days.

This patent is subject to a terminal disclaimer.

(21) Appl. No.: 11/565,266

(22) Filed: Nov. 30, 2006

(65) Prior Publication Data

US 2008/0130555 A1    Jun. 5, 2008

(51) Int. Cl.
*H04W 4/00* (2009.01)
*H04W 88/10* (2009.01)
(Continued)

(52) U.S. Cl.
CPC ............. *H04W 88/10* (2013.01); *H04W 64/00* (2013.01); *H04W 88/06* (2013.01); *H04W 92/02* (2013.01)

(58) Field of Classification Search
CPC ...... H04W 88/10; H04W 92/02; H04W 88/06; H04W 64/00
(Continued)

(56) References Cited

U.S. PATENT DOCUMENTS 4,737,978 A    4/1988 Burke et al.
5,208,756 A *  5/1993 Song .......................... 455/456.3
(Continued)

FOREIGN PATENT DOCUMENTS

EP    0504122    9/1992
EP    1587221 A2    10/2005
(Continued)

OTHER PUBLICATIONS

Han, et al. "A Method to Support Femto-Macro Handover with Minimal Interference to the Macro Network" IP.com Journal Oct. 16, 2008, pp. 1-4, West Henrietta, NY US.
(Continued)

*Primary Examiner* — Marcos Batista (57) ABSTRACT

A wireless access point manages wireless service to a multi-mode wireless communication device based on a wireless wide area network (WWAN) signal. The access point transmits a device proximity message to the WWAN based on the proximity of the multi-mode wireless communication device to the access point where the proximity is at least partially based on a WWAN signal. The device proximity message may indicate a request to perform an alternate network acquisition procedure to establish wireless service from an alternate network different than a current network providing service to the multi-mode wireless communication device. Where the current network is WWAN, and the WWAN signal is a WWAN reverse link signal transmitted by the communication device and received at the access point, the access point determines the proximity of the communication device to the access point at least partially based on the WWAN reverse link signal. The access point determines whether to provide WLAN service to the multi-mode wireless communication device at least partially on a characteristic of the WWAN signal such as, for example, a power level or signal quality. The alternate network acquisition procedure may include an instruction from the WWAN to the multi-mode wireless communication device to search for an alternate network, to search for the access point, and/or to acquire an alternate network.

19 Claims, 5 Drawing Sheets

(51) Int. Cl.
*H04W 64/00* (2009.01)
*H04W 88/06* (2009.01)
*H04W 92/02* (2009.01)

(58) Field of Classification Search
USPC .................................. 370/312, 338; 455/436
See application file for complete search history.

(56) References Cited

U.S. PATENT DOCUMENTS

| | | | |
|---|---|---|---|
| 5,293,645 | A | 3/1994 | Sood |
| 6,011,974 | A * | 1/2000 | Cedervall et al. ......... 455/456.4 |
| 6,414,635 | B1 | 7/2002 | Stewart et al. |
| 6,434,367 | B1 * | 8/2002 | Kumar et al. ................... 455/70 |
| 6,965,585 | B2 | 11/2005 | Grilli et al. |
| 6,990,324 | B2 | 1/2006 | Laroia et al. |
| 7,019,663 | B2 | 3/2006 | Sharony |
| 7,050,819 | B2 | 5/2006 | Schwengler et al. |
| 7,167,712 | B2 | 1/2007 | Ogino et al. |
| 7,260,399 | B1 | 8/2007 | Oh et al. |
| 7,286,834 | B2 | 10/2007 | Walter |
| 7,339,909 | B2 | 3/2008 | Kotzin |
| 7,433,673 | B1 | 10/2008 | Everson et al. |
| 7,539,499 | B2 | 5/2009 | Holur et al. |
| 7,610,049 | B2 * | 10/2009 | Watanabe ...................... 455/436 |
| 2003/0081572 | A1 * | 5/2003 | Kim et al. ..................... 370/332 |
| 2003/0118015 | A1 | 6/2003 | Gunnarsson et al. |
| 2003/0129993 | A1 * | 7/2003 | Overy et al. .................. 455/456 |
| 2004/0014477 | A1 * | 1/2004 | Ishiguro et al. .............. 455/450 |
| 2004/0051664 | A1 | 3/2004 | Frank |
| 2004/0090937 | A1 | 5/2004 | Chaskar et al. |
| 2004/0116133 | A1 | 6/2004 | Kalhan et al. |
| 2004/0198220 | A1 | 10/2004 | Whelan et al. |
| 2005/0059400 | A1 | 3/2005 | Jagadeesan et al. |
| 2005/0090277 | A1 * | 4/2005 | Islam et al. ................... 455/525 |
| 2005/0135459 | A1 | 6/2005 | Ginzburg et al. |
| 2005/0197132 | A1 * | 9/2005 | Lee et al. ...................... 455/450 |
| 2005/0232189 | A1 | 10/2005 | Loushine |
| 2005/0237963 | A1 * | 10/2005 | Storm ........................... 370/320 |
| 2005/0282494 | A1 | 12/2005 | Kossi et al. |
| 2006/0025138 | A1 * | 2/2006 | Kotzin ........................... 455/445 |
| 2006/0040656 | A1 * | 2/2006 | Kotzin ........................ 455/426.2 |
| 2006/0056448 | A1 | 3/2006 | Zaki et al. |
| 2006/0073840 | A1 | 4/2006 | Akgun et al. |
| 2006/0114885 | A1 | 6/2006 | Baek et al. |
| 2006/0121916 | A1 | 6/2006 | Aborn et al. |
| 2006/0203743 | A1 | 9/2006 | Quinn et al. |
| 2006/0264212 | A1 | 11/2006 | Sekhar |
| 2006/0268902 | A1 | 11/2006 | Bonner |
| 2007/0002813 | A1 | 1/2007 | Tenny et al. |
| 2007/0008925 | A1 | 1/2007 | Dravida et al. |
| 2007/0010261 | A1 | 1/2007 | Dravida et al. |
| 2007/0021127 | A1 | 1/2007 | Zheng |
| 2007/0049276 | A1 * | 3/2007 | Rimoni et al. ................ 455/436 |
| 2007/0058598 | A1 | 3/2007 | Ling |
| 2007/0076662 | A1 | 4/2007 | Jain et al. |
| 2007/0104139 | A1 | 5/2007 | Marinier et al. |
| 2007/0121560 | A1 | 5/2007 | Edge |
| 2007/0140190 | A1 | 6/2007 | Rensburg et al. |
| 2007/0149211 | A1 | 6/2007 | Dunn et al. |
| 2007/0177530 | A1 | 8/2007 | Ando et al. |
| 2007/0184845 | A1 | 8/2007 | Troncosco |
| 2007/0201403 | A1 | 8/2007 | Thome |
| 2007/0243882 | A1 | 10/2007 | Edge |
| 2007/0254620 | A1 | 11/2007 | Lindqvist et al. |
| 2008/0076420 | A1 | 3/2008 | Khetawat et al. |
| 2008/0130555 | A1 | 6/2008 | Kalhan |
| 2008/0130596 | A1 | 6/2008 | Kalhan |
| 2008/0130597 | A1 * | 6/2008 | Kalhan ......................... 370/338 |
| 2008/0130598 | A1 | 6/2008 | Kalhan |
| 2008/0132239 | A1 | 6/2008 | Khetawat et al. |
| 2008/0153497 | A1 | 6/2008 | Kalhan |
| 2008/0261615 | A1 | 10/2008 | Kalhan |
| 2008/0311927 | A1 | 12/2008 | Boman et al. |
| 2009/0129341 | A1 | 5/2009 | Balasubramanian et al. |
| 2009/0163216 | A1 | 6/2009 | Hoang et al. |
| 2009/0213819 | A1 | 8/2009 | Kalhan |
| 2009/0215400 | A1 | 8/2009 | Chang et al. |
| 2010/0093351 | A1 | 4/2010 | Barrett et al. |

FOREIGN PATENT DOCUMENTS

| | | |
|---|---|---|
| EP | 1816888 | 8/2007 |
| EP | 1986341 | 10/2008 |
| JP | 07-154848 | 6/1995 |
| JP | 2002-353876 | 12/2002 |
| JP | 2005-110314 | 4/2005 |
| JP | 2005-269109 | 9/2005 |
| WO | WO 98/19474 | 5/1998 |
| WO | WO 02/054820 A2 | 7/2002 |
| WO | WO 04/002051 | 12/2003 |
| WO | WO 2004/002051 | 12/2003 |
| WO | WO 2004/054153 | 6/2004 |
| WO | WO 2004/057815 | 7/2004 |
| WO | WO 2004/084463 A2 | 9/2004 |
| WO | WO 2005/076639 | 8/2005 |
| WO | WO 2007/064822 | 6/2007 |
| WO | WO 2008/066926 | 6/2008 |
| WO | WO 2008/066927 | 6/2008 |
| WO | WO 2008/066928 | 6/2008 |
| WO | WO 2008/066929 | 6/2008 |
| WO | WO 2008/091412 | 7/2008 |
| WO | WO 2009/067700 | 5/2009 |

OTHER PUBLICATIONS

Carstens, Juergen, "A Method for Interference Control and Power Saving for Home Access Point", IP.Com Journal, Dec. 13, 2007, pp. 1-3, West Henrietta, NY US.

Alejandro R. Holman and Edward G. Tiedemann Jr., "CDMA Intersystem Operations", 1994 IEEE 44th Vehicular Technology Conference, Jun. 8. 1994. pp. 590-594, Stockholm Sweden.

Baseband Processors Lower Bom in Femtocell Apps; Jun. 25, 2008;, ttp://www.eetasia.com/articleLogin.do?artId=8800531130&fromWhere=/ART_8800531130_499495_NP_daceb3a3.HTM8scatId=49.

Femtocell Thoughts, Sep. 2007; http://mobilesociety.typepad.com/mobile_life/2007/09/femtocell-tho-1.html.

\* cited by examiner

APPARATUS, SYSTEM AND METHOD FOR MANAGING WIRELESS LOCAL AREA NETWORK SERVICE TO A MULTI-MODE PORTABLE COMMUNICATION DEVICE

RELATED APPLICATIONS

This application is related to U.S. patent application entitled "MANAGEMENT OF WLAN AND WWAN COMMUNICATION SERVICES TO A MULTI-MODE WIRELESS COMMUNICATION DEVICE', Ser. No. 11/565,419, U.S. patent application entitled "DETECTION OF A MULTI-MODE PORTABLE COMMUNICATION DEVICE AT A MESH NETWORK", Ser. No. 11/565,323, and U.S. patent application entitled "APPARATUS, SYSTEM AND METHOD FOR MANAGING WIRELESS LOCAL AREA NETWORK SERVICE BASED ON A LOCATION OF A MULTI-MODE PORTABLE COMMUNICATION DEVICE", Ser. No. 11/565,383, all filed concurrently with this application and all incorporated by reference in their entirety, herein.

TECHNICAL FIELD

The invention relates in general to wireless communication systems and more specifically to managing wireless local area network (WLAN) services to multi-mode portable communication devices.

BACKGROUND

Wireless local area networks (WLANs) and wireless wide area networks (WWANs) provide wireless communication services to portable devices where the WLANs typically provide services within geographical service areas that are smaller than the geographical areas serviced by WWANs. Examples of WWANs include systems that operate in accordance with 2.5G (such as cdma2000), 3G (such as UMTS, WiMax), and other types of technologies, where each base station of the WWAN is typically designed to cover a service area having a size measured in miles. The term WWAN is used primarily to distinguish this group of diverse technologies from WLANs that typically have smaller service areas on the order of 100 to 300 feet per base station. Base stations in WLANs are typically referred to as access points. An access point may be connected to the Internet, intranet, or other network through wires or wirelessly through a WWAN. Examples of WLANs include systems using technologies such as Wi-Fi and other wireless protocols in accordance with IEEE 802.11 standards. WLANs typically provide higher bandwidth services than WWANs at the expense of non-ubiquitous coverage whereas WWANs provide increased coverage areas at the cost of bandwidth and/or capacity. In order to provide a wireless user with the increased overall performance and continuous connectivity, multi-mode and dual-mode portable communication devices have been developed allowing the communication device to access the particular type of network that provides the most desirable tradeoffs. A multi-mode wireless communication device includes the appropriate components and functionality for communicating within more than one network. For example, a dual-mode portable communication device can communicate within a WWAN and a WLAN.

Unfortunately, conventional techniques for managing the connection status between the portable communication device and the access point are limited in that they require GPS location information or include inefficient searching mechanisms executed by the portable communication device in order to establish service with a new network for performing a handoff between networks. For example, some conventional systems require the mobile communication device to periodically tune to an alternate network channel in an attempt to detect an alternate network resulting in significant power consumption with a limited success rate of detecting alternate networks.

Accordingly, there is a need for an apparatus, system, and method for managing WLAN service to a multi-mode portable communication device.

SUMMARY

A wireless access point manages wireless service to a multi-mode wireless communication device based on a wireless wide area network (WWAN) signal. The access point transmits a device proximity message to the WWAN based on the proximity of the multi-mode wireless communication device to the access point where the proximity is at least partially based on a WWAN signal. The device proximity message may indicate a request to perform an alternate network acquisition procedure to establish wireless service from an alternate network different than a current network providing service to the multi-mode wireless communication device. Where the current network is WWAN, and the WWAN signal is a WWAN reverse link signal transmitted by the communication device and received at the access point, the access point determines the proximity of the communication device to the access point at least partially based on the WWAN reverse link signal. The access point determines whether to provide WLAN service to the multi-mode wireless communication device at least partially on a characteristic of the WWAN signal such as, for example, a power level or signal quality. The alternate network acquisition procedure may include an instruction from the WWAN to the multi-mode wireless communication device to search for an alternate network, to search for the access point, and/or to acquire an alternate network.

DETAILED DESCRIPTION

Figure 1:
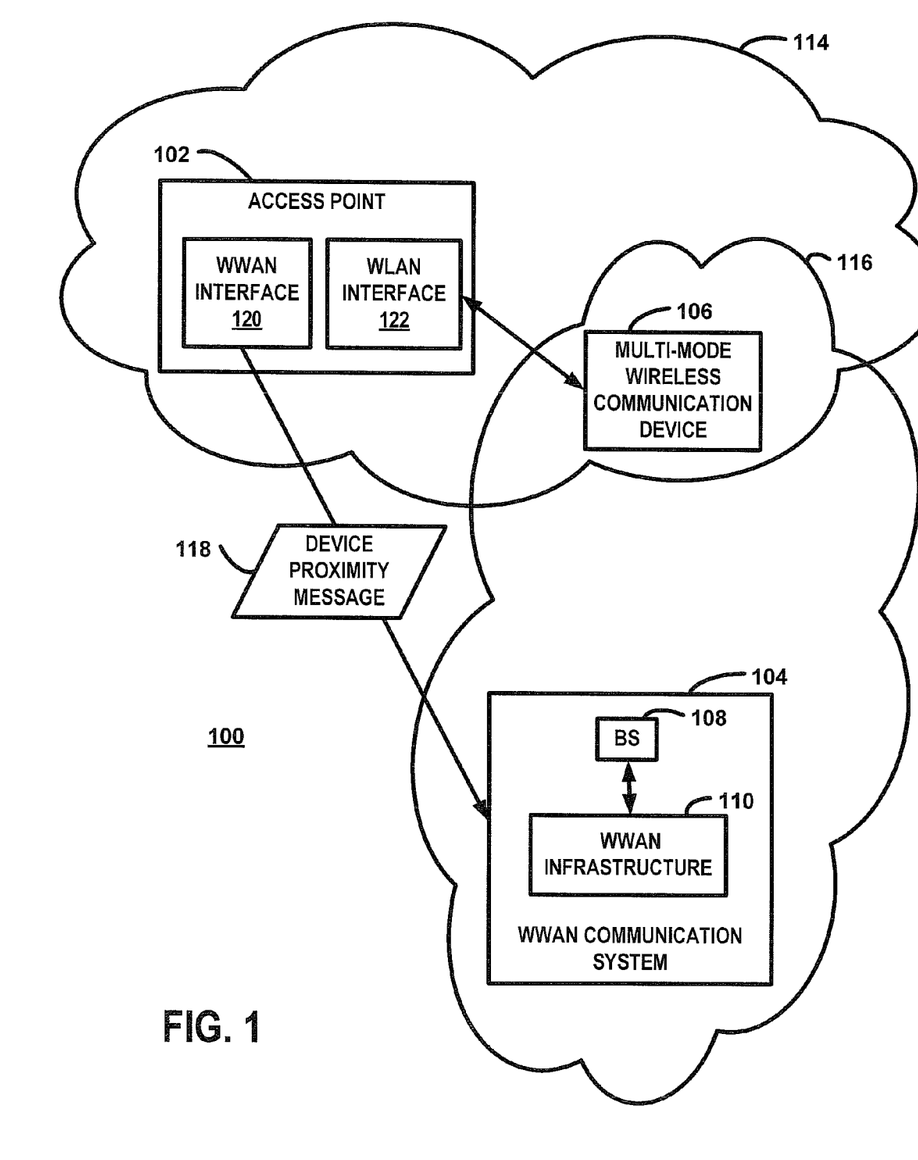
FIG. 1 is a block diagram of a communication network arrangement in accordance with the exemplary embodiment of the invention.

FIG. 1 is a block diagram of an access point 102 within a communication network arrangement 100 in accordance with the exemplary embodiment of the invention. The access point 102 communicates with a wireless wide area network (WWAN) communication system 104 and provides wireless local area network (WLAN) service to one or more multi-mode wireless communication devices 106. As described above, the term WWAN is used primarily to distinguish this group of diverse technologies from WLANs that typically have smaller service areas on the order of 100 to 300 feet per base station (access point). Accordingly, the WWAN communication system 104 is any system that provides wireless communication services within relatively large geographical areas as compared to WLANs. Examples of WWAN systems 104 include cellular communication systems that provide cellular communication services through at least one base station 108 connected to a WWAN infrastructure 110 such as a cellular system infrastructure (110). The WWAN infrastructure 110 may include one or more core networks that are connected to a global network such as Internet Protocol (IP) network or public switched telephone network (PSTN). In the exemplary embodiment, the WWAN communication system 104 operates using packet switching communication techniques. In such systems, the communication infrastructure is a packet switched core network and includes an access gateway for interfacing to WLANs using IP signaling. The WWAN communication system 104, however, may operate in accordance with circuit switched communications in some circumstances. The WWAN communication system 104 may operate using any of numerous protocols and schemes. Examples of some Code Division Multiple Access (CDMA) standards include cdma2000 1x, 1xEV-DO, and W-CDMA. In some circumstances, the WWAN communication system 104 may operate with other standards such as OFDM based standards or GSM standards, for example. In the embodiment discussed below, the WWAN system 104 is an OFDM system that operates in accordance with IEEE 802.16(e) standards often referred to as WiMax. The various functions and operations of the blocks described with reference to the WWAN communication system 104 may be implemented in any number of devices, circuits, or elements. Two or more of the functional blocks may be integrated in a single device and the functions described as performed in any single device may be implemented over several devices. For example, at least portions of the functions of the WWAN infrastructure 110 may be performed by the base station 108, a base station controller, or the MSC in some circumstances.

The access point 102 is any device capable of providing wireless local area network (WLAN) services and that can send messages to the WWAN communication system 104. Although the access point 102 is a fixed access point that is connected through a wired backhaul to an IP network in the exemplary embodiment, the access point 102 may be a cellular mobile gateway that is connected through a cellular communication link, or other WWAN link, to a WWAN. The access point 102 provides WLAN service to communication devices 108 within adequate range of the access point 102. An example of suitable technique for providing WLAN service includes operation in accordance with a WLAN protocol such as WiFi or any of the protocols defined in the IEEE 802.11 standards. Messages sent from the access point 102 to the WWAN infrastructure 110 may be sent using any combination of wired and/or wireless communication methods. In the exemplary embodiment, the access point 102 is connected to an access gateway in a core network and sends messages using packet switched data techniques, either through an IP network or through an access router. In some circumstances, messages can be sent from the access point 102 through a PSTN. In other circumstances, a transmitter may be used to wirelessly transmit the messages to the base station 108 which are then forwarded to the WWAN infrastructure 110.

The multi-mode wireless communication device 106 is any type of communication device that is capable of communicating with at least one WLAN system and at least one WWAN system 104. The multi-mode wireless communication device 106, sometimes referred to as an access terminal, may be a wireless modem, a personal digital assistant, dual mode cellular telephone, or other such device.

Accordingly, the access point 102 facilitates communication to a WLAN 114 and the WWAN communication system 104 facilitates communication to a WWAN 116, where the communication device 106 is capable of communicating on both of the networks 114, 116. The communication device 106 can access wireless services provided by either of the networks 114, 116 when resources are available on the particular network and signal quality is adequate. In the exemplary embodiment, the communication device 106 may access both networks 114, 116 simultaneously under certain conditions. In some circumstances, however, the communication device 106 may be able only to access one of the networks 114, 116 at any given time. In other scenarios, the communication device 106 may be able to access only control channels of the network 116 but have full access of network 114 or vice versa. The clouds shown in FIG. 1 symbolize networks and do not necessarily illustrate coverage areas of the networks 114, 116. For example, the geographical coverage area of the WWAN 116 may include one or more coverage areas of WLANs 114 provided by access points 102. Further, the coverage area of the WWAN 116 may have areas of poor quality areas or areas where no WWAN service is available. The areas, however, may have good coverage from a WLAN 114. Such a scenario may occur where the WLAN coverage is within a building such as an office or home and the WWAN coverage is generally available in the area of the building but lacking within the building due to walls and other signal obstructions. In addition to other advantages, managing wireless services in accordance with the exemplary embodiments maximizes the quality of the wireless services provided to the communication devices 106.

In accordance with the exemplary embodiment, the access point 102 manages wireless service to the communication device 106 based, at least partially, on a WWAN signal exchanged with the communication device 106. The WWAN signal may be a reverse link WWAN signal transmitted from the communication device 106 or a forward link WWAN signal received at the communication device 106. The access point 102 sends a device proximity message 118 to the WWAN communication system 104 based on the WWAN signal exchanged with the communication device 106. In the exemplary embodiment, the device proximity message 118 is a request message requesting the execution of an alternate network acquisition procedure. In response to the device proximity message 118, the WWAN infrastructure 110 sends a message to the communication device 106 instructing the communication device 106 to search for wireless service from an alternate network or to establish wireless service from an alternate network, where the alternate network is a network different than a current network currently providing service to the multi-mode wireless communication device. Where the current network is the WWAN network 116, the alternate network is the WLAN network 114 and where the current network is the WLAN network 114, the alternate network is the WWAN network 116. In some situations, the WWAN infrastructure 110 may evaluate other parameters before instructing the communication device 106. For example, due to subscriber parameters, system settings, or system parameters, the WWAN infrastructure may determine that the communication device 106 should not acquire an alternate network. Further, the WWAN system 104 may evaluate parameters corresponding to multiple access points where device proximity messages identifying a particular communication device 106 are received from more than one access point.

Therefore, the WWAN communication system 104 at least performs an evaluation in response to the device proximity message 118 and may perform or initiate the acquisition of the alternate wireless service to the communication device 106 in response to the device proximity message 108. The acquisition may result in a handoff of the communication device 106 from the current network to the alternate network in some circumstances or may result in the communication device 106 receiving wireless service from two networks simultaneously. Further, the communication device 106 may maintain registration with the current network although user data is only exchanged on the alternate network. In the exemplary embodiment, the device proximity message 118 is sent through either an IP network or an access router to an access gateway in the WWAN. In some circumstances, however, the device proximity message 118 is sent through a wireless link. For example, the message could be sent as a reverse link WWAN signal where the access point 102 includes a WWAN transmitter.

When the WWAN communication system 104 is providing wireless communication services to the communication device 106, the access point 102, at least periodically, monitors the WWAN reverse link channel used by the communication device 106 to transmit WWAN reverse link signals. In some cases, the access point 102 may employ procedures to detect multiple multi-mode communication devices 106. Based on the WWAN reverse link signal received at the access point 102, the access point 102 determines if the communication device 106 should at least search for WLAN service. In some circumstances, the access point 102 determines that the access point 102 should provide WLAN communication service to the communication device 106. When the WLAN determines that the communication device 106 is within range of the access point 102, the access point 102 transmits the device proximity message 118 to the WWAN communication system 104 indicating that the communication device 106 is likely within the service area of the WLAN network 114. The WWAN system 104 then performs the alternate network acquisition procedure which may include an instruction for the communication device 106 to search for WLAN service, to search for a particular access point 102, and/or to acquire WLAN service. As described in further detail below, an example of a situation where the above scenario applies includes the situation where a communication device 106 is approaching the access point 102 while receiving communication services from a WWAN.

In addition to managing wireless service as described above, the access point 102 may perform other monitoring and management procedures. For example, when the access point 102 is providing wireless communication services to the communication device 106, the communication device 106, at least periodically, monitors the WWAN forward link signals and transmits a status message to the access point 102. The forward link signals may include control signals and pilot signals as well as other information. Based on the WWAN forward link signal received at the communication device 106, the access point 102 determines if the WWAN communication system 104 should provide WWAN communication service to the communication device 106. When the WLAN determines that WWAN service should be provided or should be evaluated, the access point 102 transmits the device proximity message 118 to the WWAN communication system 104 to alert the WWAN system 104 of the potential for acquisition of the WWAN service or a handoff to WWAN service. As described in further detail below, an example of a situation where this scenario applies includes the situation where communication device 106 is traveling away from the access point 102 while receiving communication services from the access point 102. The access point 102 at least performs some decision making based on a WWAN FL signal received at the communication device 106 that acquisition of the WWAN service may be desired.

Figure 2:
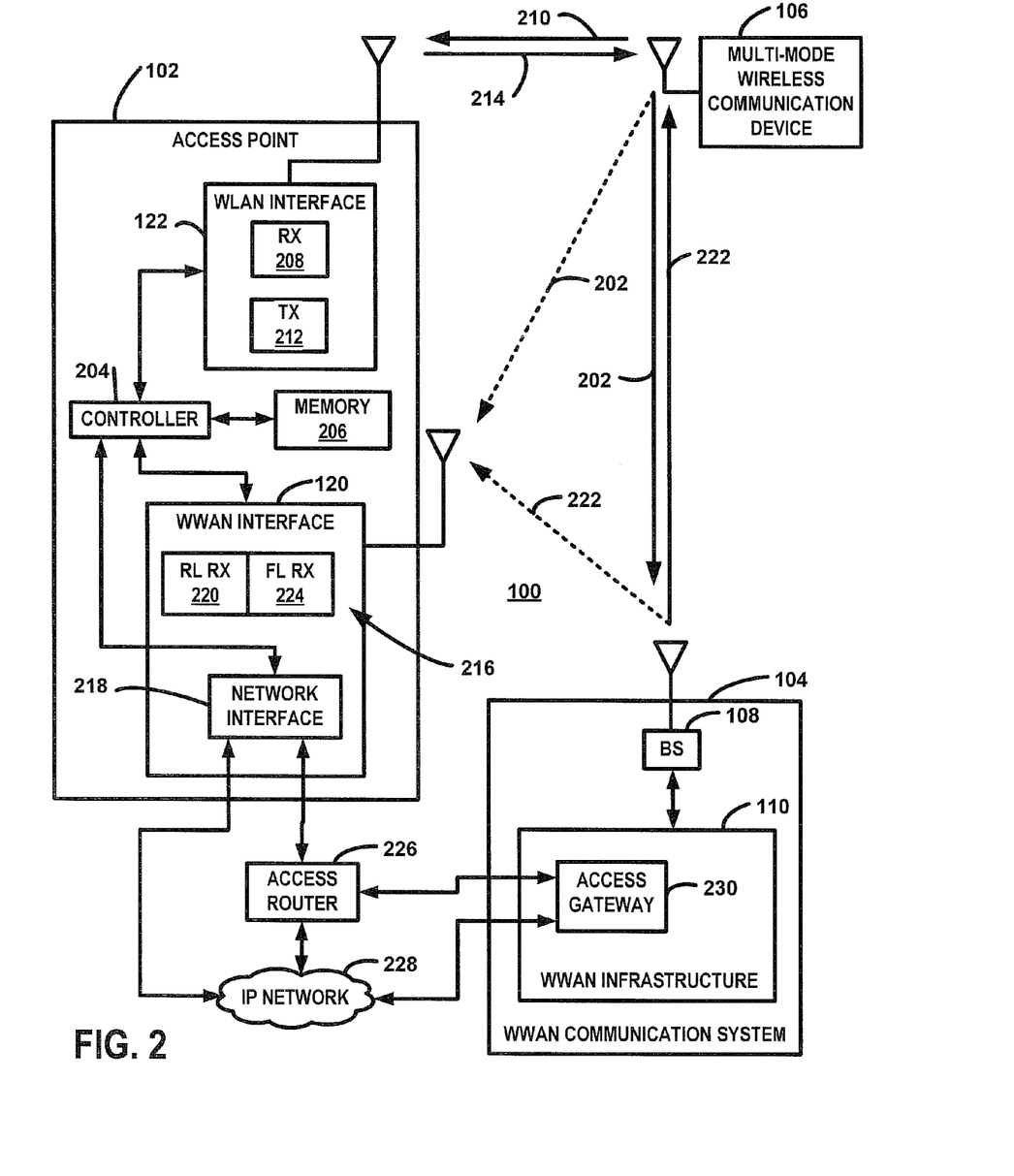
FIG. 2 is a block diagram of the communication network arrangement where the access point receives reverse link WWAN signals from the communication device.

In some situations, the access point 102 may monitor the WWAN forward link signals 222 using the WWAN FL receiver 224 and sends a message to the WWAN 110 if the access point 102 determines that the communication device 106 should be handed-off to WWAN service. For example, if the access point 102 detects that the communication device 106 is leaving the WLAN service area or that the quality of the WLAN service is otherwise decreasing, the access point 102 verifies that WWAN service is adequate by measuring the power of the WWAN FL signals 222. Although it is possible that the WWAN service may not be adequate at the communication device 106 location, this technique provides increased efficiency by not requiring the communication device to continually monitor WWAN service when communicating on the WLAN.

A WWAN interface 120 includes any combination of hardware, software and/or firmware adequate to at least detect WWAN RL signals and to send the device proximity message 118 to the WWAN system 104. As described below in further detail, the WWAN interface 120 is connected through a network interface to an access router and an IP network. The device proximity message 118 is transmitted through the network interface to WWAN infrastructure 110. In the exemplary embodiment, the WWAN interface also includes a WWAN FL receiver for receiving WWAN FL signals. In some circumstances the WWAN interface 120 may also include a WWAN transmitter.

A WLAN interface 122 includes any combination of hardware, software and/or firmware for communicating with one or more communication devices 106. As discussed below, the WLAN interface 122 includes a WLAN transmitter and a WLAN receiver.

FIG. 2 is a block diagram of the communication network arrangement 100 where the access point 102 receives reverse link (RL) WWAN signals 202 from the communication device 106. The access point 102 includes the WWAN interface 120 for communicating with the WWAN system 104 and the WLAN interface 122 for providing WLAN service to one or more communication devices such as the multi-mode wireless communication device 106. The access point 102 further comprises a controller 204 coupled to the WWAN interface 120 and the WLAN interface 122. The controller 204 performs the control functions described herein as well as performing other functions and facilitating the overall operation of the access point 102. The controller 204 is connected to, or includes, a memory 206 that may include one or more random access memory (RAM) and/or read only memory (ROM) memory devices. The WLAN interface 122 includes a WLAN receiver 208 for receiving reverse link (RL) WLAN signals 210 and a WLAN transmitter 212 for transmitting WLAN signals 214. The signals 210, 214 are transmitted and received in accordance with a WLAN protocol. Examples of a suitable WLAN protocols include protocols in accordance with the IEEE 802.11 protocol and wireless fidelity (WiFi). In some circumstances, the access point 102 may also include a wired LAN interface (not shown) for communicating with devices connected to the access point 102 through wires.

The WWAN interface 120 includes a WWAN receiver 216 that can be configured to at least receive reverse link WWAN signals 202 transmitted from a multi-mode wireless communication device 106. The WWAN interface 120 is also configured to send the device proximity message 118 to the WWAN infrastructure 110 through a network interface 218. In the exemplary embodiment, the WWAN receiver 216 can be configured as a reverse link WWAN receiver 220 for receiving reverse link WWAN signals 202 and as a forward link WWAN receiver 224 for receiving WWAN forward link signals 222 from a base station 108. In some circumstances, two separate WWAN receivers may be used to implement the WWAN reverse link and forward link receivers 220, 224. Also, in some implementations, the capability to receive WWAN forward link signals 222 may be omitted.

The network interface 218 exchanges messages with an access router 226 and an internet protocol (IP) network 228. The network interface 218 provides packet data communications and facilitates access to the Internet and to an access gateway 230 in the WWAN infrastructure 110 through the access router 226. In some circumstances, at least portions of the network interface 218 may be implemented separately from the WWAN interface 120. The access router 226 may be connected to several access points 102 and provides communication management and control functions to the WLAN. In some situations, the access router 226 may be implemented within an access point 102 or may be eliminated. In some circumstances the connection between the access gateway 230 and the access point 102 may include a wireless communication link such as satellite communication link or point-to-point microwave link, for example.

In addition to other information, the memory 206 stores communication device identification values corresponding to each communication device 106 that is authorized to use the access point 102. The communication device identification value may include an electronic serial number (ESN) or other unique data. An example of a group of identification values stored in memory includes a collection of ESNs corresponding to the communication devices of the family members of a household where the access point 102 provides WLAN service. The identification values may be stored at the access point 102 using any of numerous techniques. An example of a suitable method of storing the values includes storing the values during an initialization procedure performed when the access point 102 is installed. In some implementations, the identification values may be omitted or the access point 102 may allow communication devices that do not have corresponding identification values stored at the access point 102 to receive WLAN service from the access point 102.

The access point 102 monitors the reverse link WWAN channel(s) that may contain a reverse link WWAN signal 202 transmitted from a communication device 106 that is not currently receiving WLAN service from the access point 102. The reverse link WWAN receiver 220 is tuned, or otherwise configured, to receive the reverse link WWAN signals 202. Based on one or more received WWAN RL signals 202, the controller 204 determines the proximity of the communication device 106 to the access point 102. An example of suitable technique for determining the proximity includes evaluating a power level of the received RL WWAN signal. In some circumstances, the detection of a RL WWAN signal from the communication device 106 may be sufficient to determine that the communication device 106 is within a proximity range. In the exemplary embodiment, the proximity is used to determine whether the communication device 106 is possibly within range of the access point 102 and possibly able to receive WLAN service. Therefore, the controller 204 at least determines whether the communication device is possibly within WLAN range of the access point 102. The controller 204 may determine whether to generate and send the device proximity message 118 based on factors other than power level of the signal. For example, factors may include only the power level of the WWAN RL signal or on a factor based solely on the WWAN RL receiver's 220 ability to decode the incoming RL signal. The device proximity message 118 initiates an alternate network acquisition procedure that may result in an attempt by the communication device 106 to acquire wireless service from the access point 102 in the exemplary embodiment. The determination to generate the device proximity message 118, therefore, may be based on other criteria in addition to the proximity. Any of numerous criteria may be used to determine if WLAN service should be acquired where the criteria may include conditions related to the capacity of the access point 102 and/or the requirements of the communication device 106. The controller 204 uses the WWAN RL signal to determine if the communication device 106 is possibly within the service area of the access point 102. The criteria used to determine whether the communication device 106 is within the service area of the access point 102 depends on the type of WWAN.

Any of several techniques may be used to determine the proximity of the communication device 106 based on the WWAN RL signal. In the exemplary embodiment discussed below in further detail, a forward link WWAN signal transmitted from the base station to the communication device 106 is intercepted by the access point 102 and decoded to determine reverse link scheduling information. Based on the difference in received power and transmitted power of the WWAN RL signal, the access point 102 determines the distance. The access point 102 may also determine distance based on the difference between the arrival time and transmission time of the WWAN RL signal. In another example, the access point 102 may determine that the communication device 106 sufficiently close to generate the device proximity message 118 if the received power level is above a threshold without information regarding the transmission power level. Another example of a suitable technique of determining proximity includes utilizing multiple antennas or smart antennas to determine the proximity of the communication device 106 to the access point 102 based on the reverse link WWAN signal transmitted by the communication device 106. For example, beam forming antennas may provide distance information to allow the controller to determine whether the communication device 106 is within the WLAN service area. Other techniques or combinations of techniques may be used.

In the exemplary embodiment, the WWAN infrastructure 110 comprises a packet switched core network that includes at least one access gateway 230. The access router 226 may be connected to the access gateway 230 using any combination of wired and wireless connections. Examples of suitable connections include T1 lines, fiber optic cable, coaxial cable, and point-to-point microwave. The access gateway 230 is a communication interface that allows the access point 102 to communicate with the WWAN infrastructure.

During operation, information regarding the power level is determined by intercepting the WWAN FL signals that contains reverse link scheduling information corresponding to each communication device 106. In the exemplary embodiment, information is extracted from the UL MAP transmitted in the WWAN FL signal. The controller 202 maintains a frequency and timing information for reverse link transmission for each communication device associated with each stored identification value. Also, signal timing information extracted from the forward link WWAN signal may be used to calculate a WWAN RL signal propagation time of the WWAN RL signal and, therefore, the proximity of the communication device 106. In the exemplary embodiment where the WWAN system is an OFDMA system, communication device transmission power level is the same for each communication device unless adjusted by the OFDMA system. During system initialization of the access points, the default power level is stored in memory 206. Any adjustments to the transmission power level for a particular communication device 106 are forwarded to the access point 102 and updated in memory 206. In some circumstances, transmission power level updates may not be available and the access point uses the default values for proximity calculations. The access point determines the proximity or a proximity estimate based on the measured propagation loss of the transmitted reverse link signal and propagation time. In some situations, a combination of propagation time, propagation loss, and other parameters may be used to determine the proximity.

After determining the proximity of the communication device 106 to the access point 102, the controller 204 determines whether the access point 102 should provide WLAN service to the communication device 106. If the controller 204 determines that the access point 102 should provide WLAN service to the communication device 106, the controller 204 generates a device proximity message 118. The message 118 is sent to the WWAN communication system 104 either through the access router 226 or through the IP network 228.

The device proximity message 118 includes at least information identifying the communication device 106 that results in an interpretation by the WWAN infrastructure 110 that WLAN service may be available to the communication device. The device proximity message 118, however, may include additional information such as, for example, information identifying the access point 102, the calculated or estimated proximity of the communication device 106 to the access point 102, and available capacity on the access point 102. Access point identification information may include a SSID of the access point 102. Further, the device proximity message 118 may contain security protocol that assists the core network in identifying the access point 102. The WWAN infrastructure may perform additional analysis to determine what instructions, if any, will be sent to the communication device. In some situations, the WWAN infrastructure (core network) 110 sends an instruction to the communication device 106 indicating that the communication device 106 should search for a WLAN system. In response to the instruction, the communication device 106 activates and tunes the WLAN interface 122 to search for a WLAN signal in accordance with known techniques. In other situations, the WWAN infrastructure (core network) 110 sends an instruction to the communication device 106 indicating that the communication device 106 should search for the specific access point 102 that sent the device proximity message 118. In other situations, the WWAN infrastructure (core network) 110 may instruct the communication device 106 to acquire WLAN service.

Figure 3:
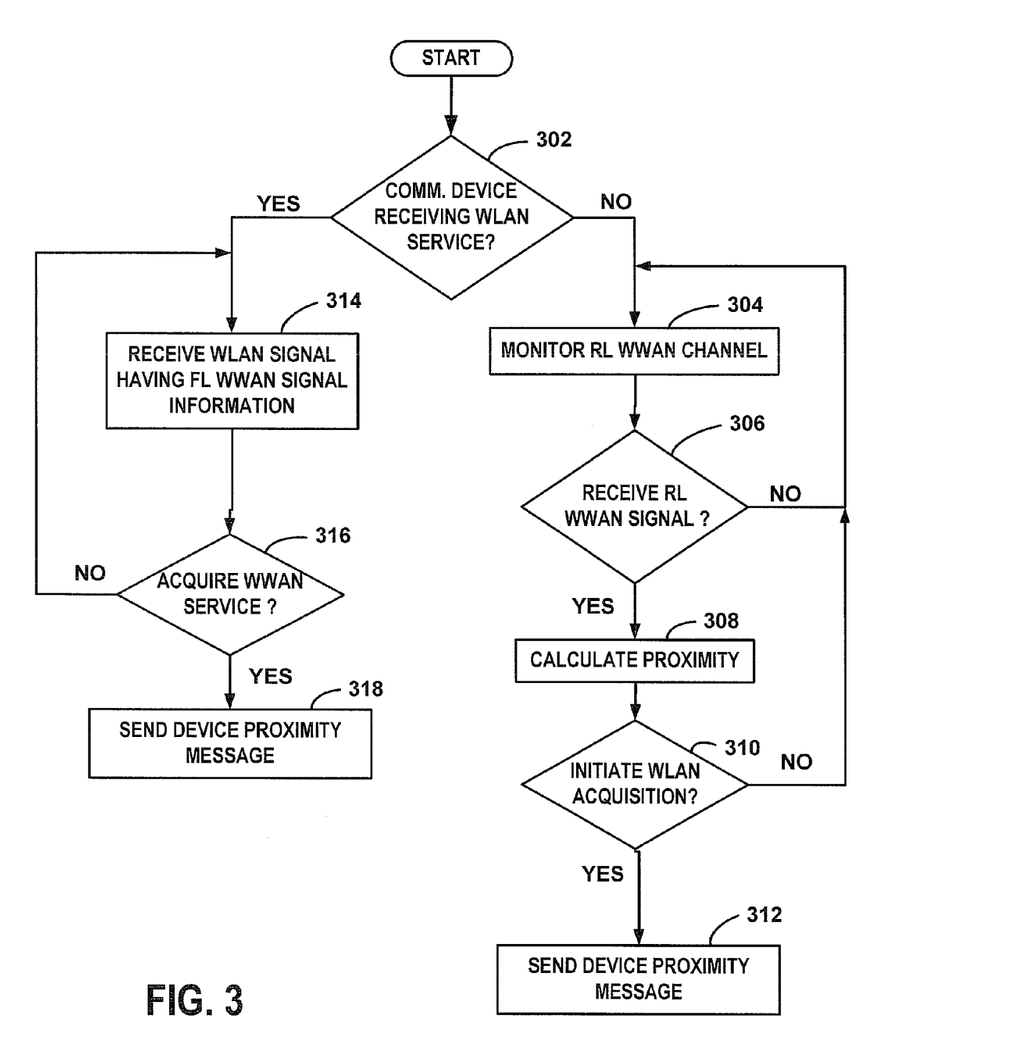
FIG. 3 is a flow chart of a method of managing wireless service to a multi-mode wireless communication device in accordance with the exemplary embodiment.

FIG. 3 is a flow chart of a method of managing wireless service to a multi-mode wireless communication device 106 in accordance with the exemplary embodiment. The method may be performed by any combination of hardware, software and/or firmware. The order of the steps discussed below may be varied and one or more steps may be performed simultaneously in some circumstances. In the exemplary embodiment, the method is performed, at least in part, by executing code on the controller 204 in the access point 102.

At step 302, it is determined whether the communication device 106 is receiving WLAN service. If the communication device 106 is currently communicating with the access point 102, the method continues at step 314. Otherwise, the method continues at step 304. Accordingly, step 304 through step 312 are performed in the exemplary embodiment for a communication device 106 that is identified in the user list but is not currently receiving WLAN communication service from the access point 102. Step 314 through step 318 are performed when the communication device 106 is in communication with the access point 102. In some circumstances, steps 314-318 can be omitted.

At step 304, the WWAN reverse link (RL) channel is monitored. In the exemplary embodiment, the WWAN RL receiver 220 is tuned to decode any WWAN RL signals 202 transmitted from any of the communication devices 106 in the user list. The reverse link scheduling information enables more efficient RL monitoring. The access point 102 may detect communication devices 106 that are not in the user list but will not be able to decode the signals without identification information. In some circumstances, however, the WWAN RL receiver 220 may be configured to monitor all RL channels.

At step 306, it is determined whether the WWAN RL receiver 220 has received a WWAN RL signal. In the exemplary embodiment, the controller 204 determines whether a WWAN RL signal has been received from a communication device listed in the user list. If a WWAN RL signal has been received, the method continues at step 308. Otherwise, the method returns to step 304 to continue monitoring the WWAN RL channels.

At step 308, the proximity of the communication device 106 to the access point 102 is calculated. The proximity calculation may be based on any number of parameters or characteristics of the received WWAN RL signal as well as other factors. Examples of suitable parameters include parameters related to signal power level and a timing offset between a transmission and reception times. Other related factors may include transmission power level, location of one or more WWAN base stations and information extracted from WWAN RL signals and WWAN FL signals such as time stamps, power level indicators, and power control indicators. In some circumstances, the proximity is based only on a detection of the WWAN RL signal. The particular factors and calculation techniques depend on the type of WWAN communication system 104. An exemplary technique suitable for an OFDM based system IEEE 802.16 is discussed with reference to FIG. 5 below.

At step 310, it is determined whether the communication device 106 should acquire WLAN service. Although the determination may be based solely on the proximity of the communication device 106 to the access point 102, other factors may be considered in some circumstances. Examples of other factors include the capacity of the access point 102, the required bandwidth required by the communication device, the current cost of the WWAN service and the estimated motion of the communication device. If the controller determines that WLAN service should be acquired, the method continues at step 312, otherwise, the method returns to step 304. In some circumstances, this step may be omitted and the access point 102 may send proximity information to the WWAN with other information to allow the WWAN system 104 to make the determination of whether a communication device 106 should acquire WLAN service from the access point 102.

At step 312, a device proximity message 118 is sent to the WWAN communication system 104. In the exemplary embodiment, the message 118 is transmitted by the VVWAN interface 120 through either the IP network 228 or through the access router 226 to the WWAN communication system 104. As discussed above, the device proximity message 118 at least indicates that the communication device 106 may be within range of the access point 102 although other indications and information may be included. The access point 102 may transmit the message using other techniques. In some circumstances, for example, the message 118 may be transmitted through a WWAN RL channel to the base station 108. The WWAN system 104 may initiate acquisition, of the WLAN service, initiate searching for WLAN service or may initiate a handoff to the access point 102.

At step 314, a WLAN signal that contains FL WWAN signal information is received. In the exemplary embodiment, a WWAN status message is transmitted by the communication device 106 to the access point 102. The WWAN status message may include WWAN FL power level information or other information related to the WWAN FL signals received at the communication device.

At step 316, it is determined whether WWAN service should be acquired. The controller 204 may evaluate any of number of factors or combinations of factors to determine whether WWAN service should be acquired for the communication device where at least one of the factors is based on the WWAN status message received from the communication device 106. Examples of factors include WWAN FL power level, WWAN signal to noise ratio, WLAN RL power level, WLAN FL power level, level of service, and service costs. If the controller 204 determines that WWAN service should be acquired, a device proximity message is sent to the WWAN system at step 318. Otherwise, the method returns to step 302.

At step 318, a device proximity message is sent to the WWAN system 104 indicating that the communication device 106 is positioned at a local where WLAN service is marginal and where WWAN service may provide increased performance. In response, the WWAN system 104 evaluates the circumstances and initiates a handoff or instructs the communication device 106 to acquire WWAN service. In some circumstances, the access point 102 may instruct the communication device 106 to acquire WWAN service by sending a message to the communication device 106. In other circumstances, the access point 102 may instruct the communication device 106 to evaluate services and acquire WWAN service if warranted.

Steps 314, 316, and 318 may be omitted in some circumstances. For example, the status of WWAN service may be determined or received at the WWAN system 104 and forwarded to the access point through the access gateway 230. In other situations, the WWAN system 104 may make all WWAN service acquisition determinations and the access point is not required to receive any WWAN service status information.

Figure 4:
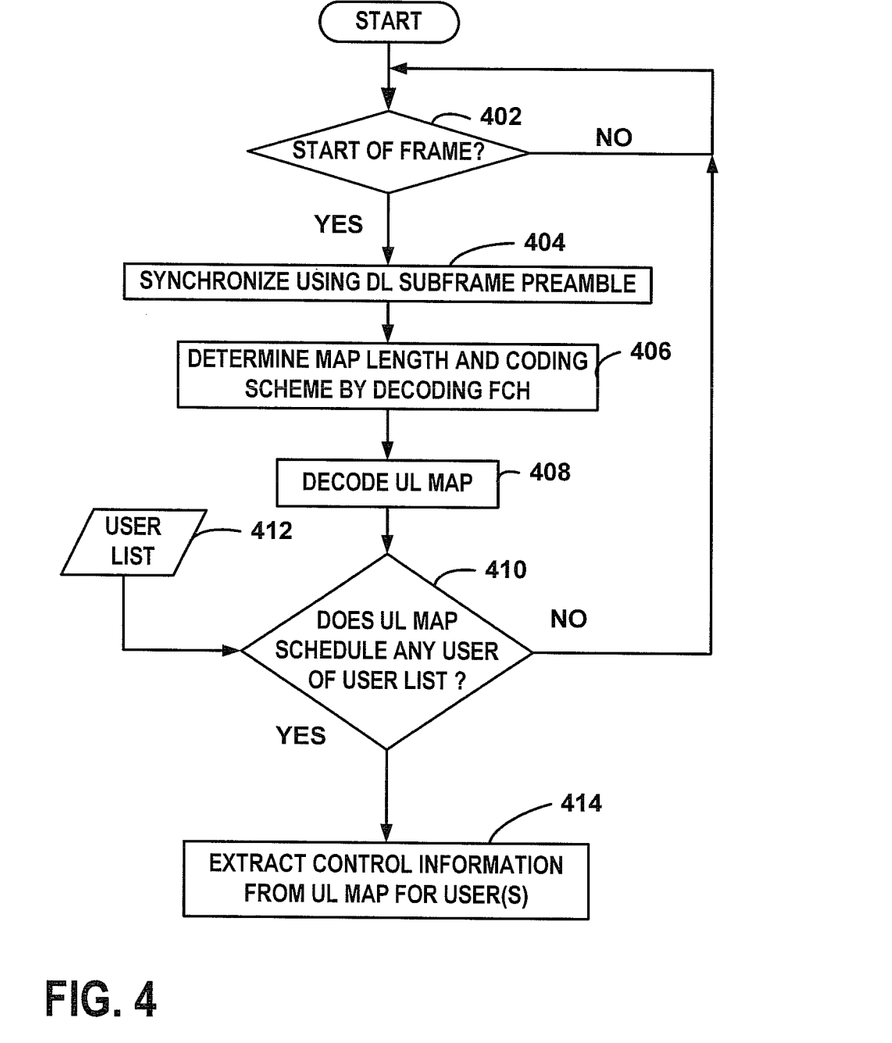
FIG. 4 is a flow chart of a method of monitoring a WWAN FL channel at an access point where the WWAN system operates in accordance with the IEEE 802.16 standard.

FIG. 4 is a flow chart of a method of monitoring a WWAN FL channel at an access point 102 where the WWAN system 104 operates in accordance with OFDM techniques. The exemplary method operates within an OFDMA system that functions in accordance with IEEE 802.16(e) protocols. The method described with reference to FIG. 4 is an example of suitable technique for acquiring information that allows the access point 102 to monitor the reverse link WWAN channels. As discussed with reference to FIG. 4 and FIG. 5, the forward link (FL) WWAN signal and WWAN FL channel are referred to as downlink (DL) signals and downlink (DL) channels and correspond to communications from an OFDMA base station, sometimes referred to as an access node (AN), to the communication device 106. As discussed with reference to FIG. 4 and FIG. 5, reverse link (RL) WWAN signals and WWAN RL channels are referred to as uplink (UL) signals and uplink (UL) channels and correspond to communications from the communication device 106 to the OFDMA base station. As is known, IEEE 802.16 (e) standards (WiMax) can operate in a time division duplex (TDD) or frequency division duplex (FDD) scheme. In the exemplary embodiment, the system operates in TDD mode. Those skilled in the art will readily apply the teachings herein to implement the system in FDD mode. In a TDD mode, each frame is split into a downlink (DL) sub-frame and an uplink (UL) sub-frame. The DL sub-frame includes a preamble, control information and other broadcast messages and packets. The control information includes DL and UL MAPs. Each communication device 106 is assigned a specific set of frequencies for receiving respective data packets. Each communication device 106 is also assigned a set of frequencies for transmitting in the UL.

At step 402, the controller 202 locates the start of a DL frame. When the start of the frame is found, the method continues at step 404. Otherwise, step 402 is repeated.

At step 404, the WWAN FL receiver 224 acquires and synchronizes to the incoming signal using the DL sub-frame preamble. The WWAN FL receiver 224, therefore, performs the functions of a DL receiver in the exemplary method.

At step 406, the Frame Control Header (FCH) is decoded to determine the DL data burst length and coding scheme. In the exemplary method, the FCH burst is followed by the preamble. In networks operating in accordance with IEEE 802.16 standards, an uplink map (UL MAP) is a Medium Access Control (MAC) message that defines burst start times and frequencies on the UL channels for each communication device 106.

At step 408, the UL MAP is decoded. Accordingly, the received DL signals provides information in the UL MAP that allows the controller 202 to determine the timing of UL signals and carrier frequencies assigned to the communication device 106. In addition, the UL MAP includes user identification (ID) information corresponding to communication devices that are receiving the DL signals from the base station (access node).

At step 410, it is determined whether one or more of the communication devices listed in a user list 412 at the access point 102 are contained in the UL MAP. The user list 412 includes identification information that uniquely identifies communication devices that are supported by the access point 102. For example, the IEEE 802.16(e) standard uses manufacturer-issued X.509 digital certificates to identify devices. The user list 412 is typically programmed at the time of installation of the access point 102 and may be modified to add or remove user IDs. The users may be members of a household that reside where the access point 102 is installed. If no user IDs in the user list are contained in the UL MAP, the method returns to step 402. Otherwise, the method continues at step 414. In some circumstances, the UL MAP may not contain an explicit identification number and may include indirect identification information that can be used to determine the identity of the communication device 106.

At step 414, the control information for all of the identified users is extracted from the UL MAP or other control messages. The control information is the transmission RL control information that includes a RL transmission power level and a RL transmission time for the WWAN RL signals transmitted by the communication devices 106. The timing information corresponding to the identified communication device is extracted from the decoded UL MAP and stored in memory.

Figure 5:
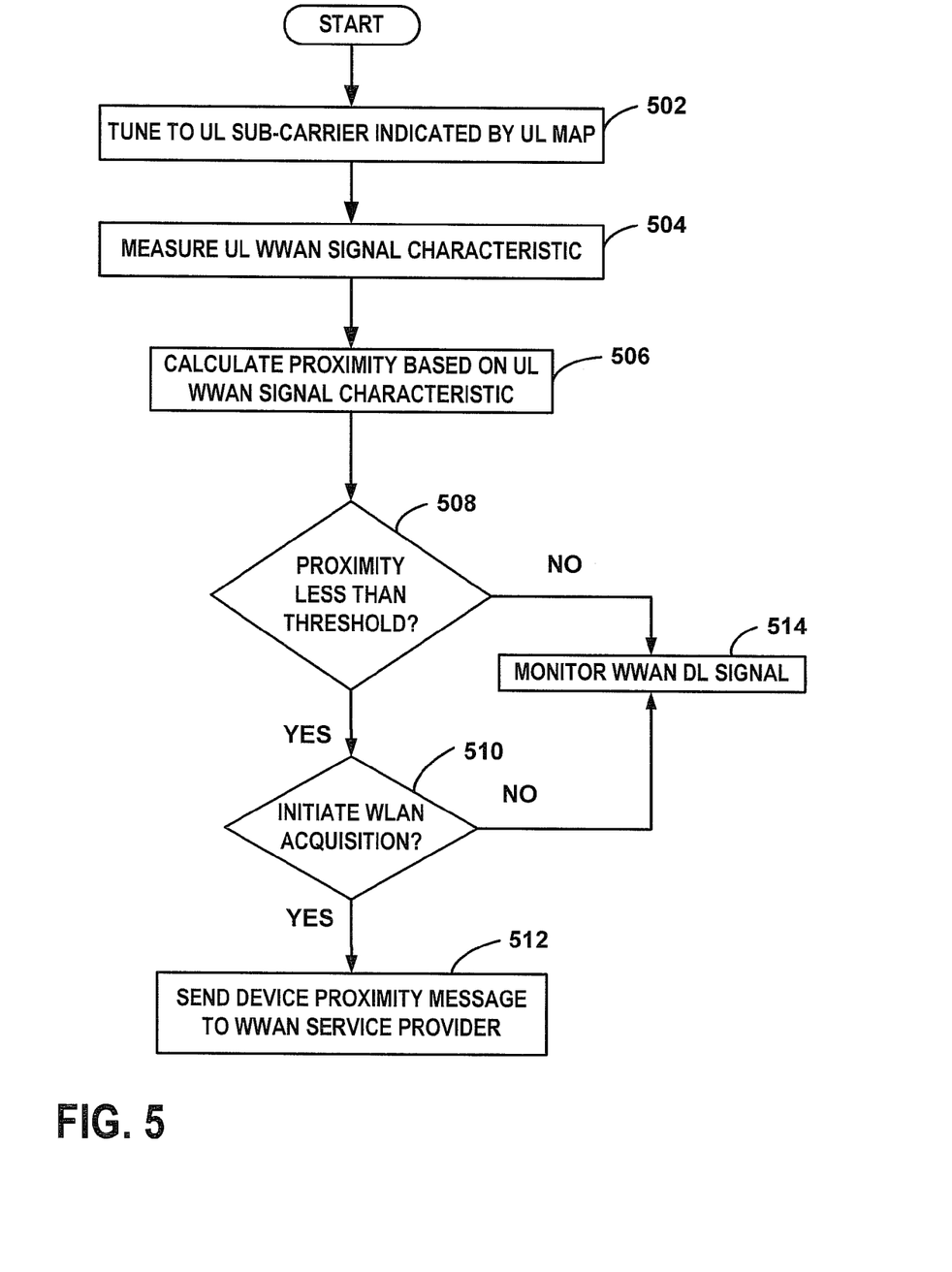
FIG. 5 is a flow chart of an exemplary method of managing wireless resources where the WWAN system operates in accordance with the IEEE 802.16 standard.

FIG. 5 is a flow chart of an exemplary method of managing wireless resources where the WWAN system 104 operates in accordance with OFDMA based system such as IEEE 802.16(e). The exemplary method is performed by the access point 102 and includes monitoring a WWAN RL channel and initiating an acquisition of WLAN service to the communication device 106 based on a received WWAN RL signal. As explained above, the WWAN RL signals and WWAN RL channels are referred to as UL signals and UL channels with reference to FIG. 5. Using the information determined with the method discussed with reference to FIG. 4, the access point 102 monitors the UL WWAN channel and sends a WLAN acquisition message if certain criteria is met. Accordingly, steps 502-514 provide an exemplary technique for performing steps 304-312 discussed with reference to FIG. 3 above.

At step 502, the WWAN receiver 216 is tuned to the UL sub-carrier frequency indicated by the UL map. The UL sub-carrier frequency extracted in step 414 is used to tune the WWAN RL receiver 220. In some situations, a single receiver may be tuned to both uplink and downlink frequencies. In the exemplary embodiment, the receiver 216 can simultaneously receive UL and DL signals.

At step 504, the characteristics of the received UL WWAN signal is measured. In the exemplary embodiment, the controller 204 determines the power level and the reception time of the received UL signal. In some situations only the reception time or the power level is determined. Using known techniques, the power of the received UL WWAN signal is measured and stored in memory. The reception time is determined relative to the system time and stored in memory. Other signal characteristics may be determined in some circumstances where the signal characteristics provide information regarding the proximity of the communication device 106 to the access point 102. In the exemplary embodiment, the identification information is used to identify the communication device 106 only and not to decode the signals in order to minimize cost. In some implementations, however, the identification information may be used to decode the WWAN RL signals.

At step 506, the controller 204 calculates the proximity of the communication device 106 transmitting the UL signal to the access point 102. Based on the characteristics of the UL signal, the controller 204 determines the distance from the access point 102 to the communication device 106. Using the transmission time of the WWAN UL signal determined from the UL MAP and reception time, the controller 204 calculates a propagation time of the signal. The propagation attenuation of the signals is determined by calculation the difference between the transmission power and the reception power. Using either or both of the propagation parameters, the controller 204 calculates the proximity of the communication device 106 to the access point 102. For example, the distance may be determined by multiplying the propagation time by the speed of light. The distance may also be calculated by comparing the propagation loss to a known propagation loss per distance function for the antennas. The distance values may be averaged or otherwise processed to determine the proximity.

At step 508, it is determined whether the proximity of the communication device 106 to the access point 102 is less than a threshold. The threshold may be based on any of several factors and may be dynamic or static. In the exemplary embodiment, the threshold is the maximum distance between the communication device 106 and the access point 102 where the access point 102 can provide WLAN service to the communication device. If the proximity is less than the threshold, the method continues at step 510. Otherwise, the method continues to step 514 where the procedure includes returning to step 402 of FIG. 4.

At step 510, it is determined whether the communication device 106 should acquire WLAN service. Although the determination may be based solely on the proximity of the communication device 106 to the access point 102, other factors may be considered in some circumstances. Examples of other factors include the capacity of the access point 102, the bandwidth required by the communication device 106, the current cost of the WWAN service and the estimated motion of the communication device 106. If the controller determines that WLAN service should be acquired, the method continues at step 512, otherwise, the method returns to step 514. In some situations, this step can be omitted and the access point 102 may send proximity information to the WWAN system 104 where the WWAN system 104 determines whether the communication device 106 should acquire WLAN service.

At step 512, a device proximity message 118 is sent to the WWAN service provider. The message includes information that when interpreted by the WWAN results in instruction from the WWAN system 104 to the communication device 106 resulting in the search for the access point 102. In some circumstances the acquisition may result in a handoff from the WWAN system to the WLAN system. In other circumstances, service may be maintained from the WWAN system 104 or the communication device 106 may remain registered on the WWAN system 104 although no user data is transmitted over the WWAN communication channels. Accordingly, step 510 provides an exemplary technique of performing step 312 where the WWAN communication system 104 operates in accordance with IEEE 802.16(e) standards.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. An access point comprising:
   a wireless local area network (WLAN) interface configured to exchange WLAN signals with a multi-mode wireless communication device;
   a wireless wide area network (WWAN) interface configured to send a device proximity message to a WWAN, the device proximity message based on a proximity of the multi-mode wireless communication device to the access point; and a controller configured to generate the device proximity message based on a proximity of the multi-mode wireless communication device to the access point, the proximity calculated using a power control indicator extracted from a forward link signal and a signal characteristic of a reverse link WWAN signal, the forward link WWAN signal transmitted from the WWAN and received at the access point, the reverse link WWAN signal received at the access point and transmitted by the multi-mode wireless communication device.

2. The access point of claim 1, wherein the device proximity message comprises a request to establish wireless service from an alternate network different than a current network providing service to the multi-mode wireless communication device.

3. The access point of claim 2, wherein the device proximity message indicates that service from the current network should be terminated.

4. The access point of claim 2, wherein the device proximity message indicates that service from the current network should be maintained.

5. The access point of claim 2, wherein the current network is the WWAN and the alternate network is the WLAN.

6. The access point of claim 2, wherein the current network is the WLAN and the alternate network is the WWAN.

7. The access point of claim 6, wherein the controller is further configured to generate the proximity message when the proximity is below a WLAN proximity threshold.

8. The access point of claim 2, wherein the WWAN interface comprises a WWAN reverse link receiver configured to receive the WWAN signal transmitted from the multi-mode communication device.

9. The access point of claim 8, wherein the WWAN interface further comprises a forward link receiver configured to receive the forward link WWAN signal comprising control data for the multi-mode wireless communication device, wherein information extracted from the forward link WWAN signal comprises the control data for the multi-mode wireless communication device.

10. The access point of claim 9, wherein the signal characteristic is a received power level of the reverse link WWAN signal and the information extracted from the forward link WWAN signal is the power control indicator transmitted in the forward link WWAN signal, the controller configured to generate the device proximity message based on the received power level of the WWAN signal and the power control indicator transmitted in the forward link WWAN signal.

11. The access point of claim 9, wherein the signal characteristic is a time of arrival of the WWAN reverse link signal at the access point and the control data comprises a timing indicator, the controller configured to determine the proximity of the multi-mode wireless communication device to the access point, at least partially, based on the timing indicator and the time of arrival of the WWAN signal at the access point.

12. An access point comprising:
a wireless local area network (WLAN) interface configured to exchange WLAN signals with a multi-mode wireless communication device;
a wireless wide area network (WWAN) reverse link (RL) receiver configured to receive a WWAN RL signal transmitted from the multi-mode wireless communication device;
a WWAN forward link receiver configured to receive WWAN forward link (FL) signals transmitted from a WWAN and comprising RL transmission control information for the multi-mode wireless communication device;
a wireless wide area network (WWAN) interface configured to transmit a device proximity message to the WWAN, the device proximity message at least partially based on a proximity of the multi-mode wireless communication device to the access point; and
a controller configured to generate the device proximity message based on a calculation of the proximity using a power control indicator extracted from a WWAN FL signal and a signal characteristic of the WWAN RL signal.

13. The access point of claim 12, wherein RL transmission control information extracted from the WWAN FL signal comprises a transmission power level of the WWAN RL signal, the controller configured to determine the proximity on a power difference between the transmission power level and a received power level of the WWAN RL signal.

14. The access point of claim 12, wherein RL transmission control information extracted from the WWAN FL signal comprises a transmission time of the WWAN RL signal, the controller configured to determine the proximity on a time difference between the transmission time and a received time of the WWAN RL signal.

15. A method performed at an access point configured to communicate with a multi-mode wireless communication device, the method comprising:
receiving a wireless wide area network (WWAN) forward link (FL) signal comprising reverse link (RL) transmission control information;
receiving a WWAN RL signal from the multi-mode wireless communication device;
receiving a WWAN status message indicating a status of at least one WWAN FL signal received at the multi-mode wireless communication device;
calculating a proximity of the multi-mode wireless communication device to the access point using a power control indicator extracted from the WWAN FL signal and a signal characteristic of the WWAN RL signal;
determining whether to send a device proximity message based on the proximity and the WWAN status message;
sending a device proximity message to a WWAN system.

16. The method of claim 15, wherein the determining the proximity comprises calculating a power difference between a WWAN RL signal transmission power level included in the RL transmission control information and a received power level of the WWAN RL signal.

17. The method of claim 15, wherein the determining the proximity comprises calculating a time difference between a WWAN RL signal transmission time included in the RL transmission control information and a received time of the WWAN RL signal.

18. The method of claim 15, wherein the WWAN status message indicates a signal-to-noise ratio of the WWAN signal at the multi-mode wireless communication device.

19. The method of claim 15, further comprising measuring the signal characteristic.

* * * * *